United States Patent
Steffens (10) Patent No.: US 8,378,882 B2
(45) Date of Patent: Feb. 19, 2013

(54) METHOD FOR OPERATING A RADAR AND RADAR

(75) Inventor: Wolf Steffens, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 418 days.

(21) Appl. No.: 12/521,395

(22) PCT Filed: Dec. 4, 2007

(86) PCT No.: PCT/EP2007/063305
§ 371 (c)(1),
(2), (4) Date: Oct. 29, 2010

(87) PCT Pub. No.: WO2008/080744

PCT Pub. Date: Jul. 10, 2008

(65) Prior Publication Data
US 2011/0037641 A1 Feb. 17, 2011

(30) Foreign Application Priority Data
Dec. 28, 2006 (DE) .......................... 10 2006 061 670

(51) Int. Cl.
*G01S 13/00* (2006.01)
*G01S 13/08* (2006.01)
*G01S 13/58* (2006.01)
(52) U.S. Cl. ............ 342/70; 342/104; 342/109; 342/196
(58) Field of Classification Search .............. 342/70–72, 342/192–196
See application file for complete search history.

(56) References Cited

U.S. PATENT DOCUMENTS

| 4,042,928 | A | * | 8/1977 | Altes | 342/192 |
| 5,363,103 | A | * | 11/1994 | Inkol | 342/13 |
| 5,504,774 | A | * | 4/1996 | Takai et al. | 375/134 |
| 5,751,240 | A | * | 5/1998 | Fujita et al. | 342/70 |
| 5,963,163 | A | * | 10/1999 | Kemkemian et al. | 342/109 |
| 6,011,514 | A | * | 1/2000 | Frankovich et al. | 342/442 |
| 6,275,180 | B1 | * | 8/2001 | Dean et al. | 342/70 |
| 6,385,268 | B1 | * | 5/2002 | Fleming et al. | 375/377 |
| 6,400,754 | B2 | * | 6/2002 | Fleming et al. | 375/140 |

(Continued)

FOREIGN PATENT DOCUMENTS

| DE | 196 51 540 | 6/1997 |
| DE | 10 2004 047 087 | 3/2006 |
| DE | 10 2005 012 945 | 9/2006 |

*Primary Examiner* — Jack W Keith
*Assistant Examiner* — Peter Bythrow
(74) *Attorney, Agent, or Firm* — Kenyon & Kenyon LLP (57) ABSTRACT

A method for operating a radar, having the following steps: determining first and second differential signals from a first and second transmitted frequency-modulated signal and received components of the first and second transmitted frequency-modulated signal reflected by a plurality of objects; determining in each case one first and one second chirp signal for each first and the second differential signal, the first chirp signal corresponding to the double differentiation of the phase of the first and the second differential signal with respect to time; assigning one of the first differential signals to one of the second differential signals, based on a correspondence of the first chirp signal, that is assigned to the one first differential signal, to the second chirp signal that is assigned to the one second differential signal; and determining the separation distance and/or the relative speed of one of the objects, based on the one first differential signal and the one second differential signal assigned to the first differential signal.

13 Claims, 6 Drawing Sheets

U.S. PATENT DOCUMENTS

| | | |
|---|---|---|
| 6,597,308 B2 * | 7/2003 | Isaji ................................ 342/70 |
| 6,781,541 B1 * | 8/2004 | Cho ............................ 342/25 D |
| 6,864,832 B2 * | 3/2005 | Mende et al. ................... 342/70 |
| 7,714,771 B2 * | 5/2010 | Lehre et al. ................... 342/109 |
| 2003/0179128 A1 * | 9/2003 | Mende et al. ................... 342/70 |
| 2004/0257266 A1 * | 12/2004 | Pleva et al. ....................... 342/70 |
| 2005/0179582 A1 * | 8/2005 | Woodington et al. ........... 342/70 |

* cited by examiner

METHOD FOR OPERATING A RADAR AND RADAR

FIELD OF THE INVENTION

The present invention relates to a method for operating a radar, particularly a radar for a driver assistance systems in a motor vehicle, and a radar which carries out the method.

BACKGROUND INFORMATION

Driver assistance systems make driving a vehicle easier in everyday situations, such as during parking, driving in columnar traffic, but also in exceptional situations such as avoiding an accident. To do this, the driver assistance systems require reliable radar systems which determine the distance from an obstacle and perhaps its speed relative to the vehicle.

FMCW radars (frequency-modulated continuous wave radar) are expediently used for this. The FMCW radar emits an output signal having other frequencies changing monotonically according to a plurality of adjustable modulation rates. The components of the emitted signal reflected by a potential obstacle are received by the radar. The instantaneously received and the instantaneously emitted signals differ in their frequency as a function of the propagation time of an emitted signal to the potential obstacle and the instantaneous modulation rate of the frequency of the emitted signal. From the difference of the frequencies, an evaluation unit determines the propagation time, and consequently, the distance from the potential obstacle.

A frequency variation also comes about, conforming to the Doppler effect, in response to the relative motion of the obstacle with respect to the radar. An evaluation of this frequency shift enables determining the relative speed.

Since a frequency shift may be attributed both to the separation distance and the relative speed, a single measurement for these two variables is not determinate.

Thus a second measurement is carried out. The modulation rate in the second measurement is different from the modulation rate in the first measurement. Because of the independence of the variation in the modulation rate of the frequency of the emitted signal, an identification of the contribution of the relative speed to the frequency shift is identifiable for the distance, in contrast to the signal propagation time measurements.

The aforementioned method requires that the first measurement be uniquely assignable to the second measurement. As long as there is only one obstacle, this is trivially possible. However, considerable difficulties arise if signals are received from a plurality of objects at different distances and/or having different relative speeds. An assignment of successive measurements to an object requires costly search algorithms, which, among other things, follow the trajectory of an object.

SUMMARY OF THE INVENTION

The method according to the present invention provides a method for operating a radar which is particularly suitable for allocating reflected signals from a plurality of objects to one another, and for estimating the respective separation distances and/or relative speeds with respect to the objects.

In this connection, the following method steps are provided:

Determining first differential signals from a first transmitted frequency-modulated signal and received components of the first emitted frequency-modulated signal reflected by a plurality of objects;

Determining in each case one first chirp signal for each first differential signal, the first chirp signal corresponding to the double differentiation of the phase of the first differential signal with respect to time;

Determining second differential signals from a second transmitted frequency-modulated signal and received components of the second transmitted frequency-modulated signal reflected by the plurality of objects;

Determining in each case one second chirp signal for each second differential signal, the second chirp signal corresponding to the double differentiation of the phase of the second differential signal with respect to time;

Assigning one of the first differential signals to one of the second differential signals, based on a correspondence of the first chirp signal, that is assigned to the one first differential signal, to the second chirp signal that is assigned to the one second differential signal; and Determining separation distance and/or relative speed of one of the objects, based on the one first differential signal and the one second differential signal assigned to the first differential signal.

The phase of a signal describes the variation with time of the amplitude. The development of the phase over time is usually subdivided into a plurality of components according to their time dependence. The frequency describes the variation with time of the phase, this variation itself being constant over time. The frequency chirp, or chirp, in brief, describes the variations in the phase, the variation itself also varying continuously over time. By the double derivation, i.e. double differentiation of the phase with respect to time, one obtains a quantity proportional to the chirp.

It is discussed in the introduction that an assignment of the first differential signals from a first measurement to the second differential signals from a second measurement is necessary in order to determine the separation distance and possibly the relative speed from the two differential signals. It was realized that such an assignment may take place by a comparison of the chirp of a first differential signal from the first measurement to the chirp of each second differential signal from the second measurements. Compared to the frequency, the chirp has a different nontrivial dependence on the separation distance, the relative speed and the modulation rate used. Consequently, the chirp includes additional, further information that one may draw upon for the evaluation.

One embodiment provides that determining the first and/or second chirp signal includes the following steps:

Ascertaining a complex spectrum of the differential signal;
adjusting one in each case of a theoretical complex spectrum to each extreme value of the complex spectrum;
determining a phase of the spectrum according to the equation $$\Phi = \arctan\left(\frac{\text{Im}(A)}{\text{Re}(A)}\right),$$

where Im(A) denotes the imaginary part and Re(A) the real part of the adjusted spectrum; and
determining the first and/or the second chirp signal as the value of the double differentiation of the phase with respect to the frequency at the frequency at which the spectrum assumes the extreme value.

The theoretical spectrum may be determined by a Fourier transform of the differential signal.

One embodiment provides that the first frequency-modulated signal has a first modulation rate and that the second frequency-modulated signal has a second modulation rate, and the first modulation rate and the second modulation rate are different.

One embodiment provides that a first chirp signal corresponds to a second chirp signal if the quotient of the first chirp signal divided by the first modulation rate differs from the quotient of the second chirp signal divided by the second modulation rate by not more than a specified threshold value. This method is particularly suitable if it can be assumed that the occurring acceleration values are small.

One embodiment provides that, from the frequencies' first and second differential signals, a first value space of potentially taken speeds of an object is determined, and from the first and second chirp signals a second value space of potentially taken speeds of the object is determined, and the object is determined as having the speed that is included in both value spaces. In the introduction, it was described that, from the frequencies of the first and second differential signals, no unequivocal statement can be made about the speed of an object if more than a first differential signal appears based on a plurality of objects. Nevertheless, an appropriate investigation limits the number of possible speeds to a first value space.

By analogy, the same problem of non-uniqueness comes up in the evaluation of the chirp signals. In the case of a plurality of objects, these too are not uniquely assignable to one another from the first and second measurements. But an evaluation of the chirp signals also limits the number of possible speeds to a second value space. Since the function of the chirp signals of the speed and the frequencies of the differential signals is different, the cut set (intersection) of the two value spaces is small, and in most cases the cut set includes only the actually assumed speeds.

DETAILED DESCRIPTION

Figure 1:
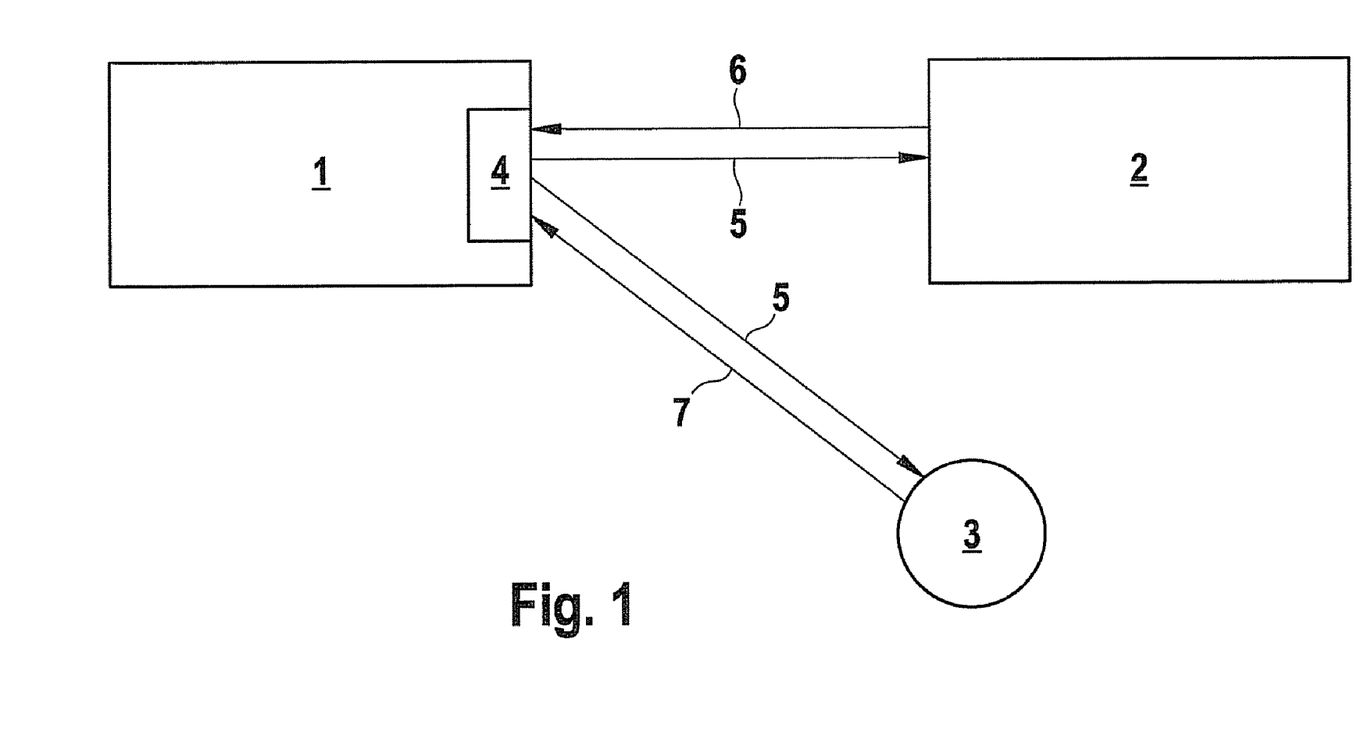
FIG. 1 shows a schematic representation of an exemplary situation in road traffic.

FIG. 1 illustrates a typical situation in road traffic. A vehicle 1 has a vehicle 2 traveling ahead of it, and laterally, at the edge of the road, there is a tree 3. The preceding vehicle 2 has essentially the same speed as vehicle 1, that is, the relative speed is almost 0. The distance apart amounts to several 10 m. The relative speed of vehicle 1 with respect to stationary tree 3 is equivalent to the speed at which the driver of vehicle 1 is driving. Many additional objects having different distances and relative speeds with respect to vehicle 1 occur in the road traffic, and tree 3 described here and preceding vehicle 2 are purely exemplary for explaining the specific embodiments described below.

Vehicle 1 has an FMCW radar 4. The radar emits an output signal 5 in the direction of preceding vehicle 2 and tree 3. Preceding vehicle 2 reflects a proportion of emitted output signal 5 in the direction of radar 4. Reflected signal 6 is received by radar 4. In the same way, a reflected signal 7 comes about from the tree, which is directed towards radar 4.

Figure 2:
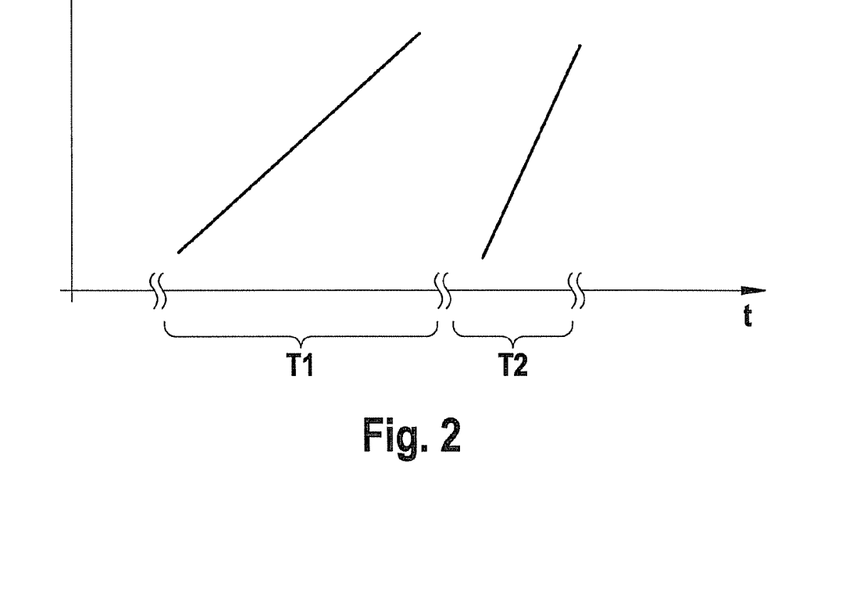
FIG. 2 shows emitted signals having different modulation rates.

The FMCW radar modulates the frequency f of emitted signal 5. Within a time period T1, T2, frequency f is modified from an initial value having a fixed modulation rate (cf. FIG. 2). During the propagation time of an emitted signal 5 from radar 4 to preceding vehicle 2 and by reflection as reflected signal 6 back to radar 4, the frequency of emitted signal 5 has changed meanwhile, and has increased in the present example. In one known modulation rate of the frequency, typically a constant modulation rate, one may consequently determine the distance from the preceding vehicle 2 from the difference in frequency between instantaneously emitted signal 5 and instantaneously received reflected signal 6.

In the above statements on determining the distance, it is assumed that preceding vehicle 2 has a relative speed of 0, i.e. no relative speed with respect to vehicle 1. Tree 3 moves towards vehicle 1. Based on the relative motion, reflected signal 7 experiences a frequency shift with respect to emitted signal 5, which is known as the Doppler effect, or Doppler shift. The frequency change is proportional to the relative speed, in a close approximation. If radar 4 does not vary the frequency of emitted signal 5 over time, one may conclude the relative speed from the frequency shift.

As a rule, the reflecting object, for instance, tree 3, has a relative speed, and the frequency of emitted signal 5 is varied over time. The differential frequency $f_d$ of the instantaneously received reflected signal and the instantaneously emitted signal is given by the following relationship:

$$f_d = \frac{2}{c}[sd + f_c v], \quad (1)$$

where c is the speed of light, s is the modulation rate of the frequency of emitted signal 5, $f_c$ is the frequency of emitted signal 5 at the point in time of the emission and v is the relative speed. As a good approximation, $f_c$ may be replaced by the average frequency of the emitted signal.

Figure 3:
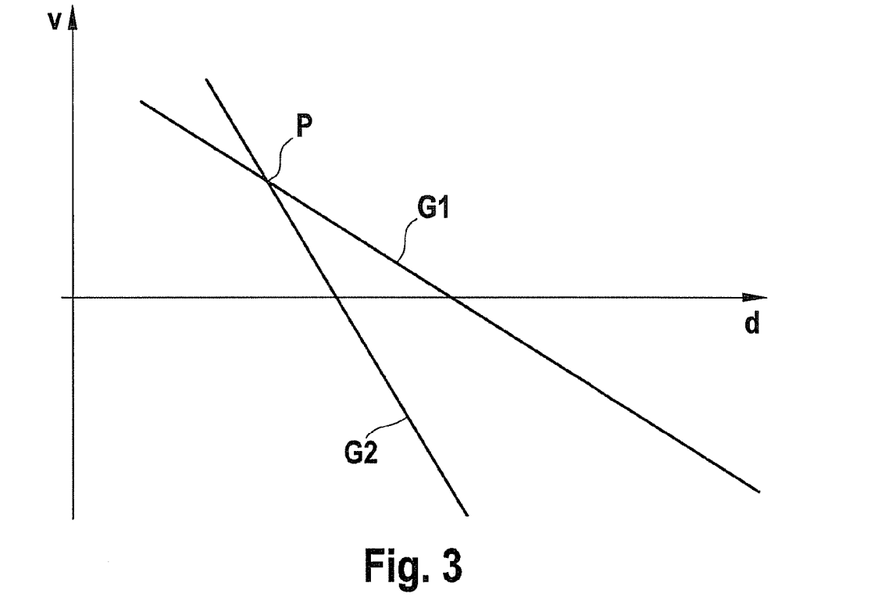
FIG. 3 shows an illustration for determining separation distance and speed using a radar according to the related art.

It may be seen from relationship (1) that, in the case of a known average frequency $f_c$, a known modulation rate s and a certain differential frequency $f_d$, there comes about a linear function between possible distances d and possible relative speeds v of a reflecting object. This function may be shown graphically as a straight line G1 in a coordinate system in which the x axis is equal to distance d and the y axis is equal to the speed v (FIG. 3). A unique determination of distance d and a unique determination of the speed v is attained by a second measurement in which the modulation rate s is changed. In the graphical representation this leads to a second straight line G2 having a slope that is changed from first straight line G1. The intersection of the two straight lines graphically gives the actual distance d and the actual relative speed v.

In order to explain the specific embodiment, described below, of a method for operating a radar, we first describe recognized properties of differential signals, that are useful to the methods and are used.

The phase of a differential signal has a time dependence which may be represented approximately by relationship (2):

$$\phi = \phi_0 + 2\pi f_d t + \pi \beta t^2 \quad (2)$$

where $\phi_0$ is a constant phase, $f_d$ is the differential frequency of the instantaneously reflected signal from the instantaneously emitted signal, β is the so-called frequency chirp and t is the time. Functions of phase φ of terms of the third order of time are negligibly small for the FMCW radars used in road traffic.

Frequency chirp β corresponds to a non-constant change in differential frequency $f_d$ over time. In an FMCW radar, frequency chirp β is made up as in relationship (3):

$$\beta = \frac{2}{c}\left(f_c a + 2sv + d\frac{ds}{dt}\right) \quad (3)$$

The term ds/dt denotes non-linearities of the modulation rate. If the non-linearity of the modulation rate falls below $2.5 \times 10^{10}$ Hz/s² in absolute value, then, at typically occurring distances d, speeds v and accelerations a, the term is negligible for chirp β.

The product of the average emission frequency $f_c$ of the FMCW radar and accelerations a that typically occur in road traffic, is at least one order of magnitude smaller than the product of modulation rate s and the typically occurring speeds v in road traffic. The typically average emission frequencies are in the range of $7.65 \times 10^{10}$ Hz and the typical modulation rates s are in the range of $5.0 \times 10^{16}$ Hz/s. Typical speeds v of a vehicle are in the range between 10 and 50 m/s, while acceleration values a reach values of 5 m/s² only in exceptional cases. As a result, frequency chirp β is a function only of speed v and modulation rate s, as a good approximation.

The determination of chirp β can be made from time-dependent phase φ by double differentiation with respect to time, as may be seen in relationship (2). In the specific embodiments described below, however, it proves expedient to determine chirp β according to the steps described below: In particular, it proves sufficient to ascertain a variable that is proportional to chirp β. In summary, it is noted how chirp β, or a variable proportional to it, is obtained by double differentiation with respect to frequency from a spectrum.

A spectrum corresponds to the Fourier transform of the phase or the phase signal. If the phase signal is able to have essentially only one extreme at a frequency of $f_d$, the spectrum may be adjusted by the following relationship:

$$A = \sqrt{\frac{\sigma}{4\rho}} \exp\left[-\frac{1}{2}\left(\frac{f-f_d}{\rho}\right)^2\right]\exp[-i\phi] + c.c. \quad (4)$$

$$\phi = \varphi_0 + \psi - \pi\left(\frac{\sigma}{\rho}\right)^2 \beta(f-f_d)^2 \quad (5)$$

$$\Psi = \arctan(2\pi\beta\sigma^2) \quad (6)$$

$$\rho^2 = 1/(2\pi\sigma)^2 + (\beta\sigma)^2 \quad (7)$$

The parameters ρ, σ and ψ denote parameters that enable adjusting a theoretical spectrum according to a relationship (4) to a real spectrum. The frequency axis is denoted by f, the frequency of the differential signal by $f_d$ and the chirp by β. The conjugate complex of spectrum A is denoted by the contraction c.c. Relationships (5), (6) and (7) give definitions for the variables used in the spectrum according to relationship (4).

If the phase signal or the differential signal has more than one extreme value, a linear combination of spectra A is adjusted according to relationship (4). Thus, each extreme value at frequency $f_d$ or each differential signal, that originates from different objects, has its own spectrum A assigned to it.

Conceptually, a phase Φ is introduced for spectrum A. Phase Φ indicates the dependence of the spectrum on frequency axis f. Below, we shall refer to phase Φ as phase Φ in the frequency space. Phase Φ in the frequency space may be determined from relationship (4), after theoretical spectrum A has been adjusted to the measured spectrum. For phase Φ in the frequency space the following applies:

$$\Phi = \arctan\left(\frac{\text{Im}(A)}{\text{Re}(A)}\right) \quad (8)$$

Phase Φ in the frequency space is a function of frequency chirp β. Frequency chirp β leads to a broadening of the extreme value of spectrum A, which is specified by parameter ρ. Since this broadening is in the range of a few percent, it is negligible.

A variable proportional to frequency chirp β is ascertained by double differentiation of phase Φ in the frequency space with respect to frequency f. The proportionality constant between the double differentiation of phase Φ in the frequency space with respect to frequency f and frequency chirp β is essentially a function only of a selected window function for ascertaining the Fourier transform, for instance, a Gaussian window function, and, in the case of a discrete Fourier transform, of the resolution of the frequency space.

Figure 4:
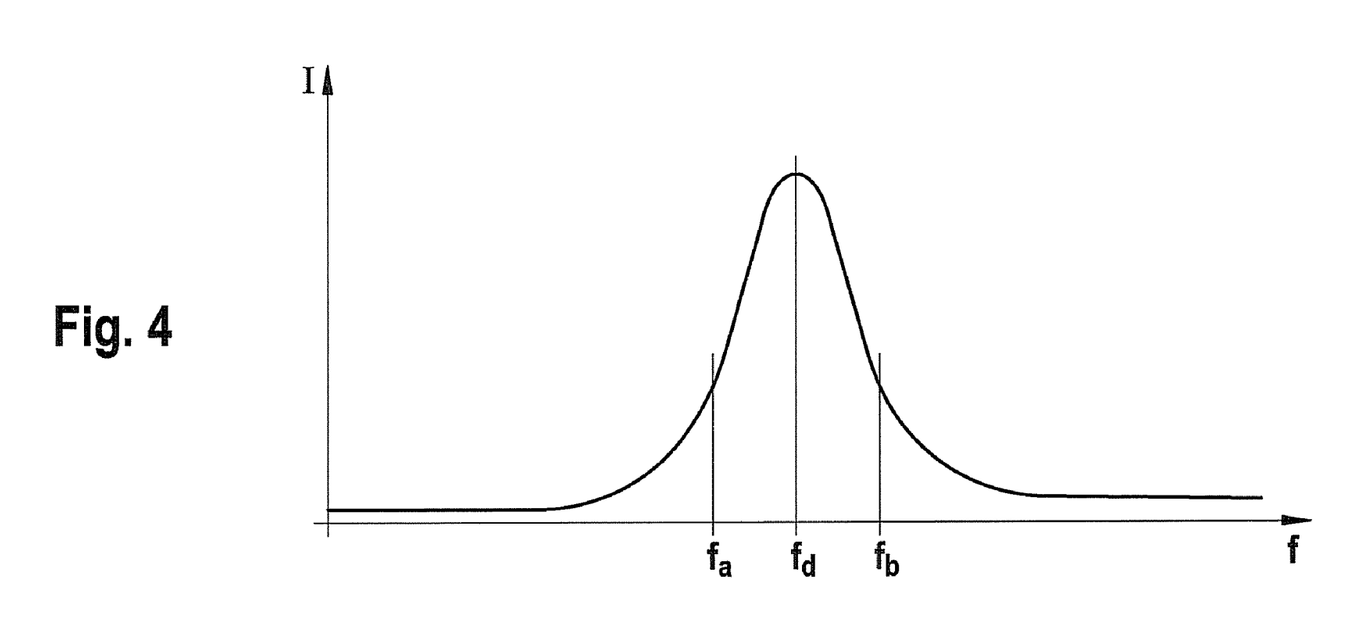
FIG. 4 shows a spectrum.

The approximate determination of the double differentiation of phase Φ in the frequency space may take place at frequency $f_d$ in the extreme case as follows:

$$\frac{d^2\Phi}{df^2} = \frac{\Phi_b - 2\Phi + \Phi_a}{(f_b - f_d)(f_d - f_a)}, \quad (9)$$

where $\Phi_a$ denotes the phase at frequency $f_a$, $\Phi_b$ the phase at frequency $f_b$ and if it is true that $f_a$ is less than frequency $f_d$ and frequency $f_d$ is less than $f_b$, compare the spectrum in FIG. 4.

The method for determining the chirp or a variable proportional to the chirp includes the following steps:
  adjusting a linear combination of spectra A according to relationship (4);
  ascertaining phase Φ in the frequency space from the respective spectra; and
  determining a variable proportional to the chirp, as the value of the double derivation of phase Φ in the frequency space at frequency $f_d$, at which the spectrum has an extreme value.

Figure 5:
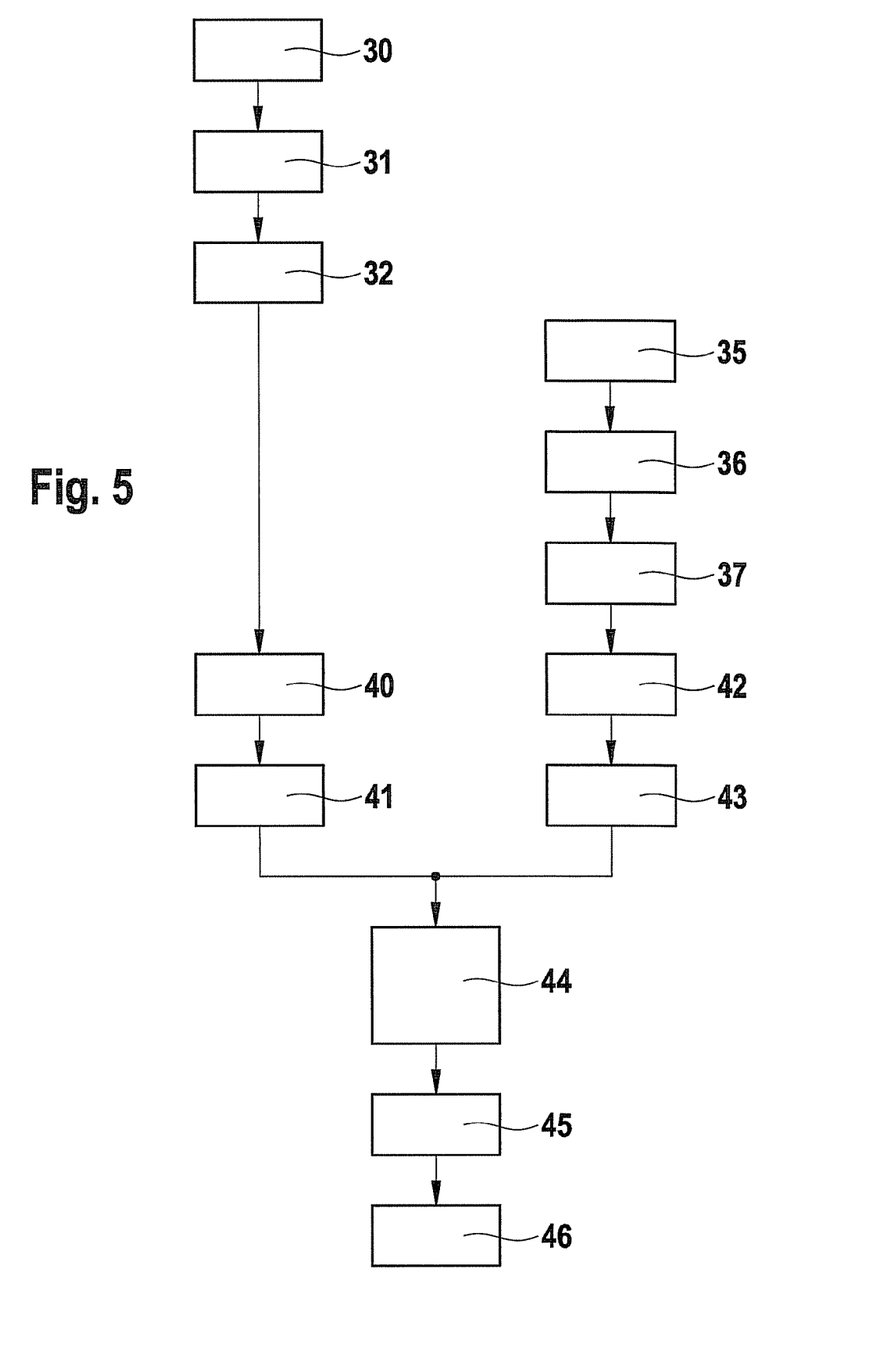
FIG. 5 shows a block diagram of a specific embodiment.

One specific embodiment of the present invention is explained in an exemplary manner with the aid of the situation shown FIG. 1, and is illustrated schematically as a flow chart in FIG. 5.

Figure 6:
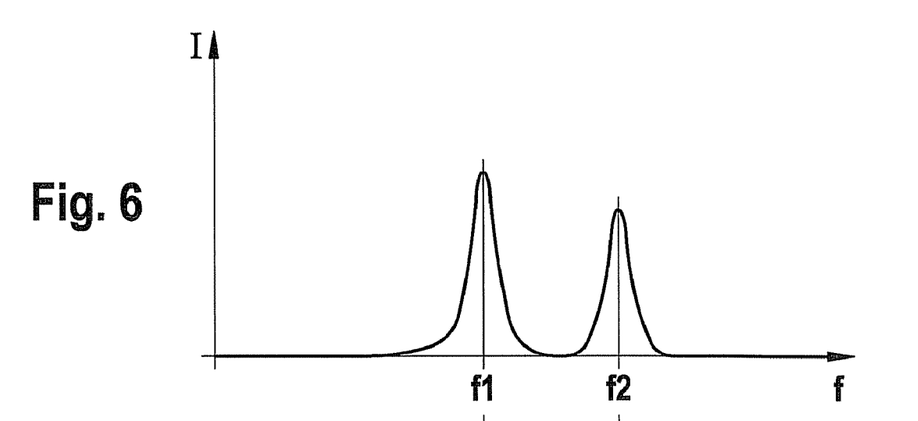
FIGS. 6 and 7 show spectra in the case of two reflecting objects.

First of all, a first modulation rate s is established (30). The FMCW radar emits signals 5 for a time in which the frequency of the emitted signal is varied (31) corresponding to first modulation rate s. Radar 4 receives two reflected signals 6, 7. FMCW radar 4 mixes the received reflected signals 6, 7 with instantaneously emitted signal 5. From the mixtures created, only the differential signal between the instantaneously emitted and the instantaneously received reflected signals 6, 7 is ascertained, and perhaps the mixers are set in such a way that only the differential signal is created. The respective differential frequencies $f_d$, that come about, of the two reflected signals 6, 7 to the instantaneously emitted signals are shown, for example, in FIG. 6 as frequency f1 and frequency f2. Typically, the two frequencies f1, f2 differ from each other.

Figure 7:
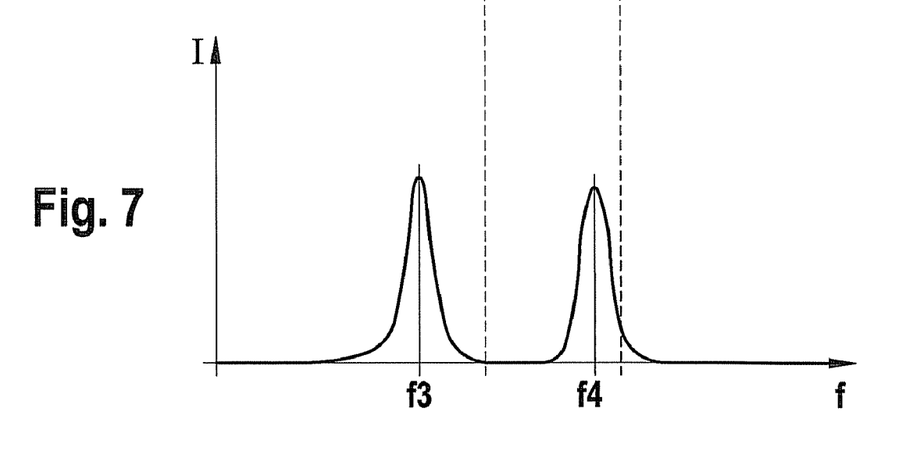

At a later time, typically within one or fewer milliseconds, a second measurement is carried out, and for this, modulation rate s of the frequency of emitted signal 5 is changed (35). Modulation rate s of the first measurement and modulation rate s of the second measurement are different. The spectrum now coming about from the differential signals may look, for instance, as illustrated in FIG. 7. The spectrum in turn has two peaks or extreme values, this time at frequencies f3, f4. However, one is not able to recognize a priori, from the spectra, whether the extreme value at frequency f1 and the extreme value at frequency f3 are assigned to reflected signals 7 of the same object, such as tree 3 or to preceding vehicle 2, or the extreme values at frequencies f1 and f4 are to be assigned to reflected signals 7 of the same object.

Figure 8:
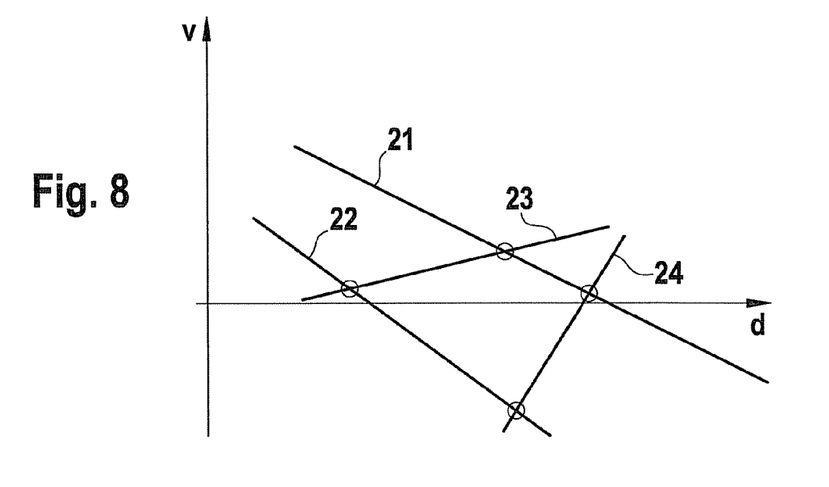
FIG. 8 shows a graph on a problem in determining separation distance and speed in the case of two reflecting objects.

The function of possible distances d of possible relative speeds v may be determined for each of the extreme values and is shown in exemplary fashion in FIG. 8. The two straight lines 21, 22 correspond, for instance, to extreme values f1, f2 in the first measurement, and the straight lines 23, 24 to the two extreme values at frequencies f3, f4 from the second measurement. Straight line 21 assigned to the first measurement intersects both straight line 23 and straight line 24 which are assigned to the second measurement. Thus, without further knowledge, no unique result is yielded as to what distance d and which relative speed v an object has, from which the reflected signal having frequency f1 in the first measurement originates. The same applies for the additional object that is identified in the first measurement by the extreme value in measurement f2.

The following method steps make it possible to provide additional information which enables one to assign the extreme value at frequency f3 or the extreme value at frequency f4 from the second measurement to the extreme value at frequency f1 from the first measurement, or at least makes it easier to see, respectively as to whether an intersection of straight line 21 with straight line 23 or an intersection of straight line 21 with straight line 24 is to be evaluated.

The chirp or the frequency chirp is determined from the differential signals of the first measurement. For this purpose, the method steps are preferably used that were described before. In the example described, a linear combination of two theoretical spectra A is adjusted to the measured spectra from the first measurement (40). The phase in the frequency space may be determined explicitly for each spectrum A. Suitable implementations (41) determine the value of the second derivative of the phase in the frequency space with respect to the frequency, at the respective extreme value, directly from the complex amplitude of the respective spectrum, using relationships (4) to (9) described above. The quantity thus obtained gives the chirp. For each object and its differential signal yielded by it, which is adjusted by a spectrum A, the respective value of the chirp is ascertained. Preferably, only one variable that is proportional to the chirp is determined.

In an analogous fashion, the chirp is ascertained for each extreme of a spectrum from the second measurement (42, 43).

In a next step (44), the respective chirps from the first measurement and the chirps from the second measurement are compared to one another. We stated before that the chirp is essentially proportional to relative speed v and modulation rate s. Between the first measurement and the second measurement it is assumed that the relative speed v or an object does not change. Accordingly, the quotient of frequency chirp β and modulation rate s is invariable. Thus, pairs of chirps from the first and the second measurement are searched for which are identical or nearly identical when divided by the modulation rate of the first or the second measurement. If there is a deviation between the quotients that is within a tolerance threshold, they are deemed to be identical.

Each chirp is ascertained from a spectrum A, which has exactly one extreme value at a frequency $f_d$. Consequently, the chirp may be assigned in each case to one extreme value in a measured spectrum. For a pair made up of a first chirp from a first measurement and a second chirp from a second measurement, the appertaining pair of the frequency assigned to the first chirp and the frequency assigned to the second chirp are ascertained (45). Using relationship (1), the distance and/or the relative speed to an object is determined (46) from the pair of frequencies.

The sequence in time of the individual method steps is not limited by the sequence described. The ascertainment of the chirps or of the chirp signals expediently takes place in separate data processing devices, so that parallel processing is possible for recording and determining the differential signals.

In one additional embodiment, the component of acceleration a in the chirp is taken into account. In the case of two successive measurements having a different modulation rate, the contribution of the acceleration to the chirp remains unchanged, but that of the relative speed changes, as may be seen from relationship (3). Consequently, for the first and the second measurement there comes about a linear function of possible accelerations and relative speeds for a measured chirp. The two functions may be plotted as straight lines in a diagram having the acceleration and the relative speed as axes. The intersection of the two straight lines then yields the actual acceleration and the actual relative speed of the object. In the case of a plurality of objects, the ambiguities come about analogously to FIG. 8, because it cannot be seen ahead of time which intersections of the straight lines are to be taken into account.

Intersections in the solution space are given by the function of relative speed and separation distance established by the measured differential frequencies (relationship 2) from the first and the second measurements. This limits at least the possibly assumed speeds to a finite number. Intersections in the solution space are given by the function of relative speed and acceleration established by the determined chirps (relationship 3) from the first and the second measurements. This also limits the possibly assumed speeds. A search for values for speeds, which are still included in both solution spaces, makes possible further limiting the speed or possibly determining it accurately.

Figure 9:
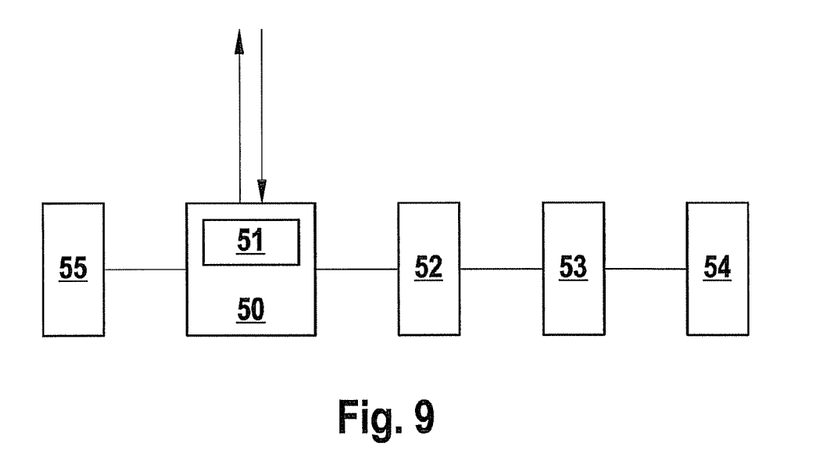
FIG. 9 shows a block diagram of a specific embodiment.

A device for carrying out the aforementioned specific embodiment, according to FIG. 9, provides at least one transmitting and one receiving device 50 for high-frequency radar signals. A mixer device 51 ascertains the differential signals from the instantaneously transmitted and the instantaneously received signals. A data processing device 52 ascertains, from the spectrum, the second derivative of the phase with respect to the frequency.

Although the present invention has been described with the aid of a preferred exemplary embodiment, it is not limited to this. In particular it is not limited to the individual method steps for ascertaining the chirps. The chirp may also be acquired by simply differentiating the spectrum in the vicinity of the extreme values, even though the aforementioned method is preferred on account of its higher quality.

What is claimed is:

1. A method for operating a radar, the method comprising:
determining, by a mixer device, first differential signals from a first transmitted frequency-modulated signal and received components of the first transmitted frequency-modulated signal reflected by a plurality of objects;

determining, by a data processing device, in each case one first chirp signal for each first differential signal, the first chirp signal corresponding to a double differentiation of a phase of the first differential signal with respect to time;

determining, by the mixer device, second differential signals from a second transmitted frequency-modulated signal and received components of the second transmitted frequency-modulated signal reflected by the plurality of objects;

determining, by the data processing device, in each case one second chirp signal for each second differential signal, the second chirp signal corresponding to a double differentiation of a phase of the second differential signal with respect to time;

assigning, by the data processing device, one of the first differential signals to one of the second differential signals, based on a correspondence of the first chirp signal, that is assigned to the one first differential signal, to the second chirp signal that is assigned to the one second differential signal; and determining, by the data processing device, at least one of a separation distance and a relative speed of one of the objects, based on the one first differential signal and the one second differential signal assigned to the first differential signal.

2. The method according to claim 1, wherein the radar is for a driver assistance system in a motor vehicle.

3. The method according to claim 1, wherein the determining of the first and/or the second chirp signal includes the following steps:
ascertaining a complex spectrum of the differential signal;
adjusting one in each case of a theoretical complex spectrum to each extreme value of the complex spectrum;
determining a phase of the spectrum according to the equation $$\Phi = \arctan\left(\frac{\text{Im}(A)}{\text{Re}(A)}\right),$$

where Im(A) denotes the imaginary part and Re(A) the real part of the adjusted spectrum; and
determining the first and/or the second chirp signal as the value of the double differentiation of the phase with respect to the frequency at the frequency at which the spectrum assumes the extreme value.

4. The method according to claim 3, wherein the theoretical spectrum is determined by a Fourier transform of the differential signal.

5. The method according to claim 1, wherein the first frequency-modulated signal has a first modulation rate and the second frequency-modulated signal has a second modulation rate, and the first modulation rate and the second modulation rate are different.

6. The method according to claim 5, wherein a first chirp signal corresponds to a second chirp signal if the quotient of the first chirp signal, divided by the first modulation rate, differs from the quotient of the second chirp signal, divided by the second modulation rate, by not more than a specified threshold value.

7. The method according to claim 1, wherein a first value space of potentially assumed speeds of an object is determined from frequencies of the first and the second differential signals, and a second value space of potentially assumed speeds of the object is determined from the first and the second chirp signals, and the object is determined as having a speed that is included in both value spaces.

8. The method according to claim 1, wherein the radar is for a driver assistance system in a motor vehicle, and wherein the determining of the first and/or the second chirp signal includes the following:
ascertaining a complex spectrum of the differential signal;
adjusting one in each case of a theoretical complex spectrum to each extreme value of the complex spectrum;
determining a phase of the spectrum according to the equation $$\Phi = \arctan\left(\frac{\text{Im}(A)}{\text{Re}(A)}\right),$$

where Im(A) denotes the imaginary part and Re(A) the real part of the adjusted spectrum; and
determining the first and/or the second chirp signal as the value of the double differentiation of the phase with respect to the frequency at the frequency at which the spectrum assumes the extreme value.

9. The method according to claim 8, wherein the theoretical spectrum is determined by a Fourier transform of the differential signal.

10. The method according to claim 1, wherein the radar is for a driver assistance system in a motor vehicle, and wherein the first frequency-modulated signal has a first modulation rate and the second frequency-modulated signal has a second modulation rate, and the first modulation rate and the second modulation rate are different.

11. The method according to claim 10, wherein the radar is for a driver assistance system in a motor vehicle, and wherein a first chirp signal corresponds to a second chirp signal if the quotient of the first chirp signal, divided by the first modulation rate, differs from the quotient of the second chirp signal, divided by the second modulation rate, by not more than a specified threshold value.

12. The method according to claim 11, wherein the radar is for a driver assistance system in a motor vehicle, and wherein a first value space of potentially assumed speeds of an object is determined from frequencies of the first and the second differential signals, and a second value space of potentially assumed speeds of the object is determined from the first and the second chirp signals, and the object is determined as having a speed that is included in both value spaces.

13. The method according to claim 10, wherein the radar is for a driver assistance system in a motor vehicle, and wherein a first value space of potentially assumed speeds of an object is determined from frequencies of the first and the second differential signals, and a second value space of potentially assumed speeds of the object is determined from the first and the second chirp signals, and the object is determined as having a speed that is included in both value spaces.

* * * * *

UNITED STATES PATENT AND TRADEMARK OFFICE
CERTIFICATE OF CORRECTION

PATENT NO.       : 8,378,882 B2                                                                 Page 1 of 1
APPLICATION NO.  : 12/521395
DATED            : February 19, 2013
INVENTOR(S)      : Wolf Steffens It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 906 days.

Signed and Sealed this
First Day of September, 2015

Michelle K. Lee
*Director of the United States Patent and Trademark Office*